(No Model.)
H. B. SPENCER.
NIPPLE HOLDER.
No. 456,860. Patented July 28, 1891.
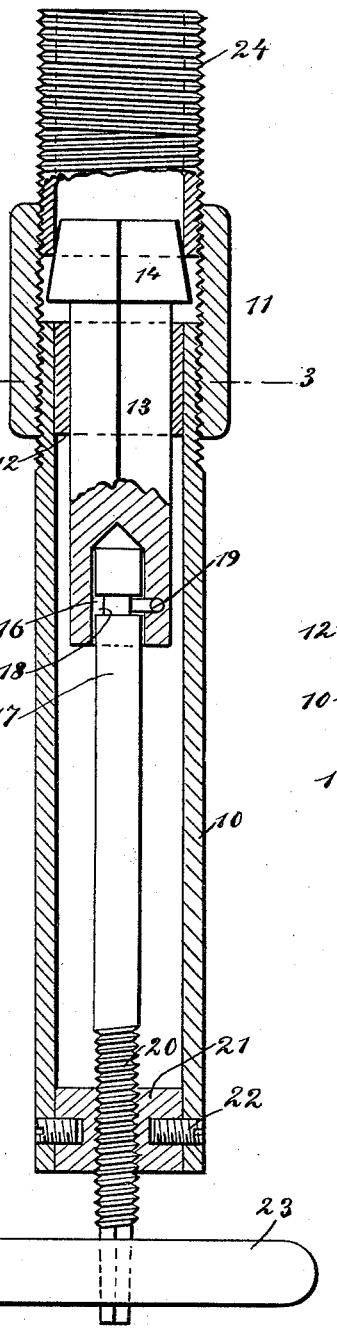
WITNESSES:
INVENTOR:
H. B. Spencer
BY Munn & Co.
ATTORNEYS

UNITED STATES PATENT OFFICE.

HENRY B. SPENCER, OF CATSKILL, NEW YORK.

NIPPLE-HOLDER.

SPECIFICATION forming part of Letters Patent No. 456,860, dated July 28, 1891.

Application filed March 26, 1891. Serial No. 386,504. (No model.)

*To all whom it may concern:*

Be it known that I, HENRY B. SPENCER, of Catskill, in the county of Greene and State of New York, have invented a new and Improved Nipple-Holder, of which the following is a full, clear, and exact description.

My invention relates to improvements in nipple-holders, and the object of my invention is to produce a simple and convenient device which will efficiently hold the nipple while a thread is being cut thereon; and to this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a longitudinal section of the nipple-holder, showing a nipple in position therein. Fig. 2 is an end view of the same, looking into the chuck; and Fig. 3 is a cross-section on the line 3 3 of Fig. 1.

A pipe 10 forms the body of the nipple-holder, and screwed to one end of the pipe is a coupling 11, which is threaded throughout its entire length on the inner side to enable it to be screwed to the body and to receive a nipple. In the end of the body adjacent to the coupling is a plug 12, which has a square hole through it to receive the shank 13 of a head 14, which head is arranged to move longitudinally within the coupling 11, and, in connection with the coupling, it forms a chuck, which is adapted to hold the nipple. The plug 12 and the coupling 11 are secured to the pipe 10 by means of set-screws 15, which extend through the three pipes, as shown in sectional view in Fig. 3. It will thus be seen that the head 14 and shank 13 may move longitudinally without affecting the plug or the coupling. The head 14 is of a generally rectangular shape and tapers toward the outer end, so that it is slightly wedge-shaped, and there are cutting-edges at the corners. It is not essential, however, that the head be shaped as shown and described, the only essential feature being that it taper and that it have cutting-edges.

In the inner end of the shank 13 is a socket 16, which receives the end of the spindle 17, and the spindle is provided with an annular groove 18 within the socket, and the spindle is held within the socket by means of a key 19, which extends through the inner portion of the shank and through the groove in the spindle. It will thus be seen that the spindle may turn freely without affecting the shank 13; but when it is moved longitudinally the shank will be moved with it. The spindle 17 projects outward through the end of the body 10 opposite that which carries the coupling 11, and the outer portion of the spindle is screw-threaded, as shown at 20, and fits in a threaded perforation in a plug 21, which plug is secured in the end of the body 10 by set-screws 22. The outer end of the spindle 17 is squared and provided with a wheel 23, so that it may be easily turned; but any kind of a wrench may be used to turn the spindle instead of the wheel.

When a nipple 24 is to be held in the nipple-holder, it is first threaded on one end in the usual way, and is then screwed into the coupling 11. The spindle 17 is then turned by means of the wheel 23, and this forces out the shank 13 and head 14, so that the head will enter the portion of the nipple and the cutting-edges of the head will embed themselves into the nipple, the nipple being held between the head and the coupling, and the head will thus prevent the nipple from turning. The body 10 is held securely in a vise in the ordinary way, and the thread is then cut upon the nipple 24 by means of a die in the usual manner.

Having thus fully described my invention, I claim as new and desire to secure by Letters Patent—

1. A nipple-holder comprising a hollow body threaded internally at one end, a head held to move within the body and provided with cutting-edges, and means for moving the head longitudinally, substantially as described.

2. A nipple-holder comprising a hollow body having an interior screw-thread at one end, a plug secured in the body and provided with a squared hole, a tapering head having cutting-edges and provided with a shank which moves in the plug, and means for moving the shank and head, substantially as described.

3. A nipple-holder comprising a hollow body having one end internally screw-threaded and having a plug therein adjacent to the threaded portion, the plug having a squared hole extending through it, a tapering head with cutting-edges mounted in the threaded portion of the body and provided with a shank extending through the hole in the plug, and a screw mechanism for moving the shank and head, substantially as described.

4. In a nipple-holder, the combination, with a hollow body having a threaded end and a movable head and shank mounted in the body, of a screw-spindle loosely connected with the shank and extending outward through the end of the body, substantially as described.

5. In a nipple-holder, the combination, with a body having one end threaded and a movable head and shank mounted in the body, the shank having a socket in its inner end, of a spindle having its inner end arranged to enter the socket of the shank and held loosely therein and having its opposite end screw-threaded and mounted in a threaded plug, said threaded end extending outward through the body, substantially as described.

HENRY B. SPENCER.

Witnesses:
CLARENCE E. BLOODGOOD,
AMBROSE JONES.